(12) United States Patent
Chen et al.

(10) Patent No.: US 12,504,925 B2
(45) Date of Patent: Dec. 23, 2025

(54) STORAGE NODE, STORAGE DEVICE, AND NETWORK CHIP

(71) Applicant: HUAWEI TECHNOLOGIES CO., LTD., Guangdong (CN)

(72) Inventors: Piao Chen, Chengdu (CN); Feng Wang, Chengdu (CN); Chunyi Tan, Chengdu (CN); Huaqiang Wang, Shenzhen (CN); Zhongwu Cheng, Shenzhen (CN); Xianjun He, Chengdu (CN); Hao Sun, Chengdu (CN)

(73) Assignee: Huawei Technologies Co., LTD., Shenzhen (CN)

( * ) Notice: Subject to any disclaimer, the term of this patent is extended or adjusted under 35 U.S.C. 154(b) by 29 days.

(21) Appl. No.: 18/298,014

(22) Filed: Apr. 10, 2023

(65) Prior Publication Data

US 2023/0244417 A1 Aug. 3, 2023

Related U.S. Application Data

(63) Continuation of application No. PCT/CN2021/115195, filed on Aug. 30, 2021.

(30) Foreign Application Priority Data

Oct. 10, 2020 (CN) .......................... 202011079543.9
Dec. 18, 2020 (CN) .......................... 202011504326.X

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/067* (2013.01)

(58) Field of Classification Search
None
See application file for complete search history.

(56) References Cited

U.S. PATENT DOCUMENTS 7,849,259 B1 12/2010 Wong et al.
2009/0125604 A1 5/2009 Chang et al.
(Continued)

FOREIGN PATENT DOCUMENTS

CN 103441948 A 12/2013
CN 107003943 A 8/2017
(Continued)

OTHER PUBLICATIONS

International Search Report and Written Opinion in International Appln. No. PCT/CN2021/115195, mailed on Nov. 25, 2021, 13 pages (with English translation).
(Continued)

*Primary Examiner* — Daniel D Tsui
(74) *Attorney, Agent, or Firm* — Fish & Richardson P.C.

(57) ABSTRACT

This disclosure provides methods and storage nodes including network chip and storage devices. In an implementation, a method performed by a network chip comprises generating a command based on an access request from a client, storing the command in a first table in a memory of a storage device connected to the network chip, and executing the command in the first table to access data stored in the storage device.

21 Claims, 13 Drawing Sheets

(56) References Cited

U.S. PATENT DOCUMENTS

| | | | |
|---|---|---|---|
| 2011/0178790 A1* | 7/2011 | Golbourn | G06F 11/2069 |
| | | | 703/22 |
| 2017/0034267 A1* | 2/2017 | Nagasubramaniam | ...................... |
| | | | H04L 47/781 |
| 2017/0075855 A1* | 3/2017 | Sajeepa | G06F 15/17331 |
| 2018/0335955 A1 | 11/2018 | Schreter | |
| 2019/0102107 A1 | 4/2019 | Guim Bernat | |
| 2021/0286527 A1* | 9/2021 | Gong | G06F 3/0605 |

FOREIGN PATENT DOCUMENTS

| | | | |
|---|---|---|---|
| CN | 109656855 A | 4/2019 | |
| CN | 111212141 A | 5/2020 | |
| CN | 111221758 A | 6/2020 | |

OTHER PUBLICATIONS

Extended European Search Report in European Appln No. 21876919.8, dated Feb. 2, 2024, 12 pages.

\* cited by examiner

STORAGE NODE, STORAGE DEVICE, AND NETWORK CHIP

CROSS-REFERENCE TO RELATED APPLICATIONS

This application is a continuation of International Application No. PCT/CN2021/115195, filed on Aug. 30, 2021, which claims priority to Chinese Patent Application No. 202011504326.X, filed on Dec. 18, 2020, and Chinese Patent Application No. 202011079543.9, filed on Oct. 10, 2020. All of the aforementioned patent applications are hereby incorporated by reference in their entireties.

TECHNICAL FIELD

This application relates to the storage field, and specifically, to a storage node, a storage device, and a network chip.

BACKGROUND

In an existing storage network, clients and storage nodes are connected in a many-to-many manner through a network. As shown in FIG. 1, a plurality of storage nodes 120 are connected to a plurality of clients 130 through a network 110, and the client 130 sends a read/write request to the storage node 120 through the network. In a related technology, to reduce load of the client 130 and the storage node 120, data transmission is usually performed via respective network chips, for example, by using a remote direct memory access (RDMA) technology. Before data transmission is performed between the client and the storage node via the network chips, the client needs to establish a connection to each hard disk in the storage node, and data transmission needs to be performed between the client and each hard disk of the storage node by using information about the connection. In the conventional technology, information about a connection is stored in the network chips. However, storage space of a network chip in the storage node is limited. Consequently, when there are a relatively large quantity of hard disks in the storage node, or a quantity of clients connected to the storage node increases, the network chip cannot store the information about the connection between each hard disk and the client, and therefore performance of the storage node is deteriorated.

SUMMARY

Embodiments of this application are intended to provide a storage solution in which a large quantity of connections are supported, to resolve disadvantages of the conventional technology.

To achieve the foregoing objective, according to a first aspect, this application provides a storage node, including a network chip and a storage device. The network chip is configured to generate a command based on an access request of a client, store the command in a first table in a memory of the storage device, and execute the command in the first table to access the storage device. The storage device is configured to store data accessed by using the command.

The memory of the storage device is opened to the network chip, so that the network chip offloads a table resource to the memory of the storage device. This reduces storage pressure of the network chip, and increases a quantity of connections that the network chip can support.

In a possible design, the network chip stores a correspondence between an identifier of a connection between the client and the storage device and an address of the first table. When the network chip is configured to store the command in the first table in the memory of the storage device, the network chip is specifically configured to: obtain the identifier of the connection between the client and the storage device from the access request; determine the address of the first table based on the identifier of the connection; and store the command in the first table.

By using the identifier of the connection, the network chip can search for a table resource in the storage device more quickly.

In a possible design, the network chip is further configured to receive a connection request of the client; generate the identifier of the connection based on the connection request, and generate the first table in the memory of the storage device; and record the correspondence between the identifier of the connection and the address of the first table.

A connection relationship between the client and the storage device may be established pertinently based on the connection request, to avoid redundant connections.

In a possible design, the storage device further includes a controller. The controller is configured to: obtain an address of a first memory area in the memory of the storage device, and register the address of the first memory area with the network chip; and when the network chip is configured to generate the first table in the memory of the storage device, the network chip is specifically configured to generate the first table in the first memory area in the memory of the storage device.

As a control center of the storage node, the controller may map first memory space of the storage device to the network chip when a system is started.

In a possible design, the connection between the client and the storage device is a remote direct memory access RDMA connection, and the first table is a receive queue RQ. When the network chip is configured to store the command in the first table in the memory of the storage device, the network chip is specifically configured to store the command in the RQ in the memory of the storage device.

RDMA is a typical application scenario of this application.

In a possible design, after receiving the connection request of the client, the network chip is further configured to generate a second table in the memory of the storage device, and record a correspondence between the identifier of the connection and an address of the second table. After obtaining the identifier of the connection from the access request, the network chip is further configured to obtain the address of the second table. After the network chip completes executing the command in the first table, the network chip is further configured to store a notification message indicating that execution of the command is completed in the second table.

The notification message indicating that execution of the command is completed is sent to the client by using the second table, and in this case, the entire communication procedure ends.

In a possible design, the second table is a completion queue CQ.

In an RDMA scenario, a completion message is transmitted between the client and the storage node usually through the CQ.

In a possible design, the access request is a write request. The network chip is further configured to: after receiving the write request, write to-be-written data written into the write request into the first memory area in the memory of the storage device or into a cache of the network chip. When the network chip is configured to execute the command in the first table, the network chip is specifically configured to write the to-be-written data into a second memory area in the memory of the storage device from the first memory area or the cache of the network chip.

The foregoing is an execution process of a general write request.

In a possible design, the access request is a write request, and the write request carries to-be-written data. When the network chip is configured to store the command in the first table in the memory of the storage device, the network chip is specifically configured to store the command in the first table in the memory of the storage device, where the command includes the to-be-written data. When the network chip is configured to execute the command in the first table, the network chip is specifically configured to write the to-be-written data into a second memory area in the memory of the storage device from the first table.

The foregoing is an execution process of an immediate write request.

In a possible design, the access request is a read request. The network chip is specifically configured to forward the received read request to the storage device. After the storage device reads to-be-read data corresponding to the read request into a second memory area in the memory of the storage device, the network chip generates a read command, where the read command is used to read the to-be-read data from the second memory area; and the network chip stores the read command in a third table of the first memory area of the storage device and executes the read command to send the to-be-read data.

The foregoing is an execution process of a general read request.

In a possible design, the access request is a read request. The network chip is specifically configured to forward the received read request to the storage device. After the storage device reads to-be-read data corresponding to the read request into a second memory area in the memory of the storage device, the network chip generates a read command, where the read command carries the to-be-read data; and the network chip stores the read command in a third table and executes the read command to send the to-be-read data.

The foregoing is an execution process of an immediate read request.

In a possible design, after receiving the connection request of the client, the network chip is further configured to generate the third table in the memory of the storage device, and record a correspondence between the identifier of the connection and an address of the third table. After obtaining the identifier of the connection from the access request, the network chip is further configured to obtain the address of the third table. The network chip stores the read command in the third table in the memory of the storage device based on the address of the third table.

An association is established between the identifier of the connection and the third table, so that the network chip can quickly find a third table resource by using the identifier of the connection.

In a possible design, the third table is a send queue SQ.

The SQ is a table resource used by the RDMA to send data.

In a possible design, when the storage node is started, the memory of the storage device is shared with the network chip.

In a possible design, the network chip is a network adapter.

In a possible design, when communication between the client and the network node ends, a record in the network chip is deleted, and space in the memory of the storage device corresponding to the record is released.

In a possible design, a correspondence between an identifier of a connection and a table stored by the network chip is one-to-many, and different tables are located in memories of different storage devices.

A plurality of storage devices are classified into one group. This can improve reliability of data sending and receiving.

According to a second aspect, the present invention provides a storage device, including a memory and a network chip. The memory is configured to store data. A function of the network chip is the same as a function of the network chip of the storage node according to the first aspect.

The network chip is configured in the storage device, so that the storage device can support more connections.

According to a third aspect, the present invention provides a data access method, applied to a network chip, where the network chip is connected to a storage device, and the method includes: generating a command based on an access request of a client; storing the command in a first table in a memory of the storage device; and executing the command in the first table to access the storage device.

In a possible design, the network chip is disposed in a storage device, a controller, or a storage node.

The network chip may be disposed in a controller, a storage device, or a storage node.

In a possible design, the network chip stores a correspondence between an identifier of a connection between the client and the storage device and an address of the first table, and the storing the command in a first table in a memory of the storage device is specifically: obtaining the identifier of the connection between the client and the storage device from the access request; determining the address of the first table based on the identifier of the connection; and storing the command in the first table.

In a possible design, the method further includes: receiving a connection request of the client; generating the identifier of the connection based on the connection request, and generating the first table in the memory of the storage device; and recording the correspondence between the identifier of the connection and the address of the first table.

In a possible design, the storage device further includes a controller. The method further includes: receiving an address of a first memory area that is sent by the controller, where the address of the first memory area is obtained by the controller from the memory of the storage device; and the generating the first table in the memory of the storage device is specifically: generating the first table in the first memory area in the memory of the storage device.

In a possible design, the method includes: after receiving the connection request of the client, generating a second table in the memory of the storage device, and recording a correspondence between the identifier of the connection and an address of the second table; after obtaining the identifier of the connection from the access request, obtaining the address of the second table; and after completing executing the command in the first table, storing a notification message indicating that execution of the command is completed in the second table.

In a possible design, the access request is a write request. The method further includes: after receiving the write request, writing to-be-written data written into the write request into the first memory area in the memory of the storage device or into a cache of the network chip; and the executing the command in the first table is specifically: writing the to-be-written data into a second memory area in the memory of the storage device from the first memory area or the cache of the network chip.

In a possible design, the access request is a write request, and the write request carries to-be-written data. The storing the command in a first table in a memory of the storage device is specifically: storing the command in the first table in the memory of the storage device, where the command includes the to-be-written data; and the executing the command in the first table is specifically: writing the to-be-written data into a second memory area in the memory of the storage device from the first table.

In a possible design, the access request is a read request. The method further includes: forwarding the received read request to the storage device; generating a read command after the storage device reads to-be-read data corresponding to the read request into a second memory area in the memory of the storage device, where the read command is used to read the to-be-read data from the second memory area; and storing the read command in a third table of the first memory area of the storage device and executing the read command to send the to-be-read data.

In a possible design, the access request is a read request. The method further includes: forwarding the received read request to the storage device; generating a read command after the storage device reads to-be-read data corresponding to the read request into a second memory area in the memory of the storage device, where the read command carries the to-be-read data; and storing the read command in a third table and executing the read command to send the to-be-read data.

In a possible design, the method further includes: after receiving the connection request of the client, generating the third table in the memory of the storage device, and recording a correspondence between the identifier of the connection and an address of the third table; obtaining the address of the third table after obtaining the identifier of the connection from the access request; and storing the read command in the third table in the memory of the storage device based on the address of the third table.

According to a fourth aspect, the present invention provides a data access apparatus, applied to a network chip, where the network chip is connected to a storage device, and the apparatus is configured to perform the method performed by the network chip according to the third aspect.

According to a fifth aspect, the present invention provides a computer-readable storage medium, where the computer-readable storage medium stores computer programs or instructions, and when the computer programs or the instructions are executed on a computer, the computer is enabled to perform the method according to any one of the third aspect.

According to a sixth aspect, the present invention provides a computer program product, where the computer program product includes instructions, and when the instructions are run on a computer, the computer is enabled to perform the method according to any one of the third aspect.

According to a seventh aspect, the present invention provides a network adapter, including a communications interface and a processing chip, where the communications interface is configured to receive data, and the processing chip is configured to perform the method according to the third aspect on the data.

According to an eighth aspect, the present invention provides a network chip, including a storage unit and a controller, where the storage unit stores program instructions, and the controller is configured to execute the program instructions to implement the method according to the third aspect.

BRIEF DESCRIPTION OF DRAWINGS

By describing the embodiments of this application with reference to the accompanying drawings, the embodiments of this application may be clearer.

DESCRIPTION OF EMBODIMENTS

To make the objectives, technical solutions, and advantages of this application more understandable, the following provides detailed descriptions. The detailed descriptions provide various embodiments of a device and/or a process by using block diagrams, flowcharts, and/or examples. These block diagrams, flowcharts, and/or examples include one or more functions and/or operations. Therefore, a person in the art may understand that each function and/or operation in the block diagrams, the flowcharts, and/or the examples may be performed independently and/or jointly through much hardware, software, and firmware, and/or any combination thereof.

In a related technology, information about a connection established between each storage device in a storage node and a client is stored in a network chip of the storage node. In this case, when a quantity of clients connected to the storage node increases, or a quantity of storage devices in the storage node increases, because storage space of the network chip of the storage node is limited, only some pieces of information about the connection can be stored in a memory of the storage node, and the information about the connection is read from the memory when the information about the connection needs to be used. In this way, switching in and out of the information about the connection causes performance degradation of the storage node. In this application, information about a connection between each storage device and a client is stored in a memory of each storage device. In this way, clients and storage devices of a storage node transmit data based on information about connections that are stored in memories of the storage devices, and therefore, a quantity of pieces of information about connections established between the storage devices of the storage node and the clients is not limited by storage space of a network chip. This improves performance of the storage node.

Figure 1:
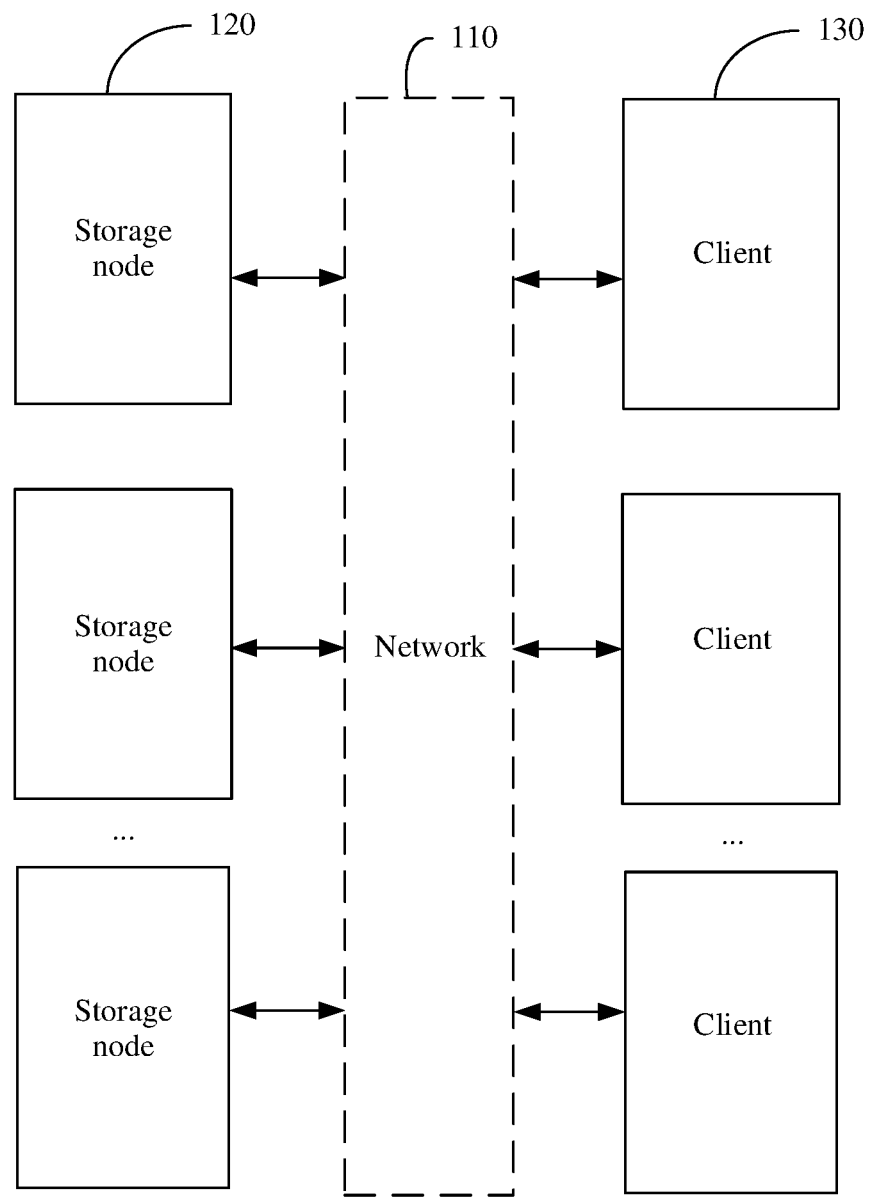
FIG. 1 is a simplified block diagram of a storage network according to an embodiment of the present invention.
Figure 2:
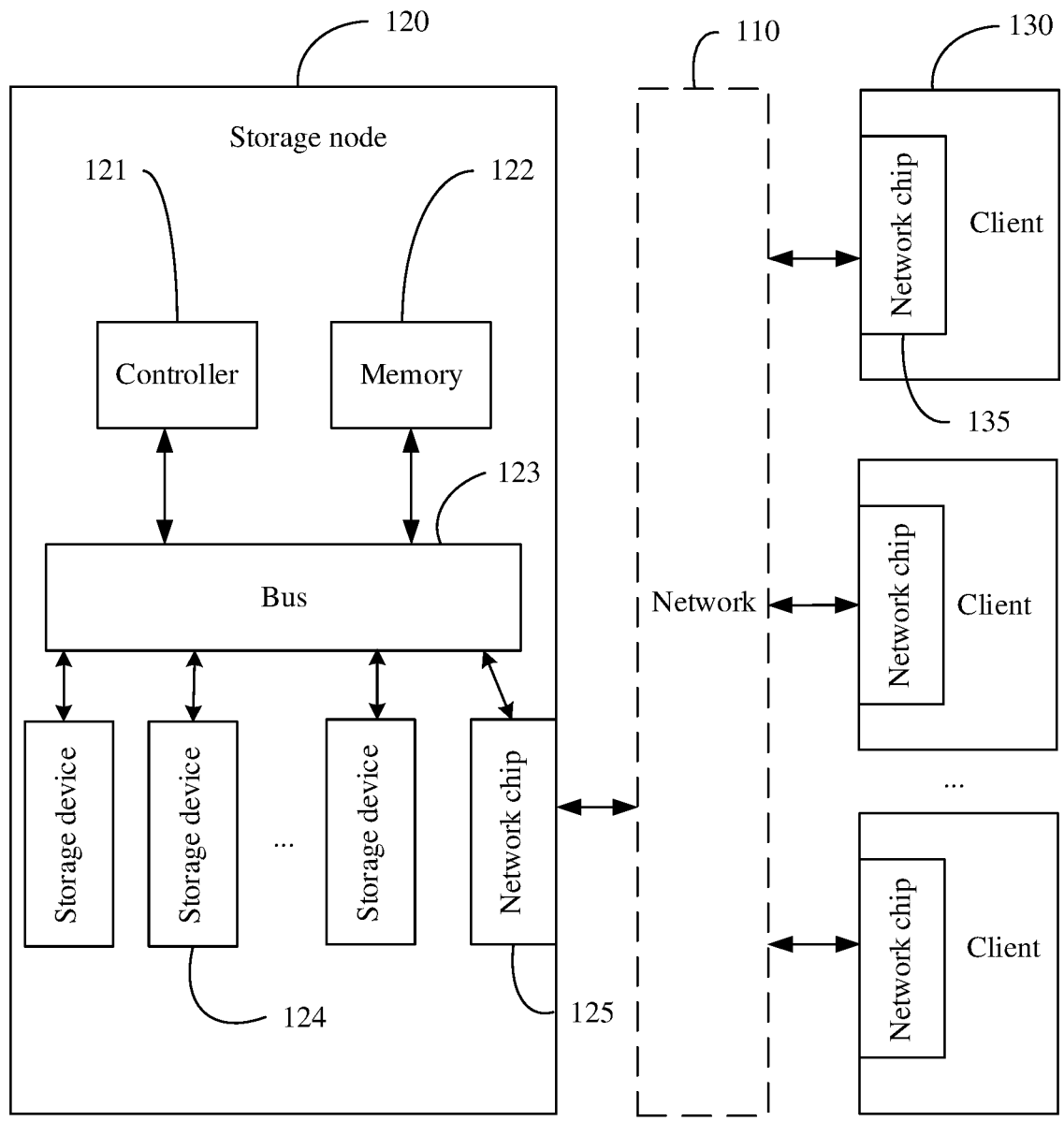
FIG. 2 is a block diagram of a structure in which one storage node is connected to a plurality of clients in FIG. 1.

An architecture of a storage system provided in this embodiment of the present invention is the same as that in FIG. 1, that is, a plurality of storage nodes 120 are connected to a plurality of clients 130 through a network 110, and the clients 130 transmit data with the storage nodes 120 through the network 110. For ease of description, in this embodiment of the present invention, only one client 120 and one storage node are used as an example to describe data transmission between the client and the storage node. As shown in FIG. 2, the storage node 120 includes a controller 121, a memory 122, a plurality of storage devices 124, and a network chip 125 that are connected by using a bus 123.

The controller 121 is a control center of the storage node 120. Optionally, the controller 121 includes one or more central processing units (Central Processing Units, CPUs), and the controller 121 may be a single-core (single-CPU) processor or a multi-core (multi-CPU) processor. The term "controller" used in this specification refers to one or more devices, circuits, and/or processing kernels configured to process program instructions.

The memory 122 is configured to store program instructions, and the controller 121 obtains and executes the program instructions from the memory 122. For example, the memory 122 may be a random access memory (Random Access Memory, RAM).

The bus 123 is configured to transmit data between the controller 121, the storage device 124, and the network chip 125. For example, the bus 123 may be a high-speed peripheral component interconnect express (Peripheral component interconnect express, PCIe) bus.

The storage device 124 is configured to permanently store data from the client 130. The storage device 124 may be a plurality of types of hard disks, for example, a solid-state drive (Solid-State Drive, SSD), a serial attached SCSI (Serial Attached SCSI, SAS) hard disk, or a fiber channel (Fiber Channel, FC) hard disk drive (Hard Disk Drive, HDD), where the SCSI (Small Computer System Interface) is a midrange computer system interface. A structure of the storage device 124 is shown in FIG. 3.

Data is transmitted between the storage node 120 and the client 130 via the network chip 125 of the storage node and a network chip 135 of the client.

Figure 3:
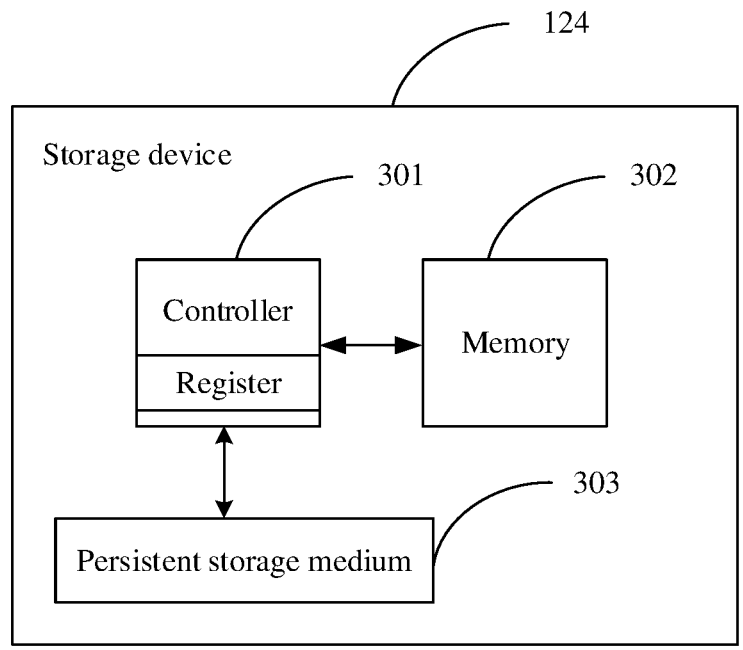
FIG. 3 is a block diagram of a structure of a storage device in the storage node in FIG. 2.

As shown in FIG. 3, the storage device 124 includes a memory 302 and a persistent storage medium 303 that are connected to a controller 301. The controller 301 is a control center of the storage device 124. The controller 301 includes a register, and the register is configured to temporarily store an instruction, data, and an address of the controller 301. The memory 302 is configured to store program instructions, and the controller 301 executes the program instructions in the memory 302, to implement functions corresponding to the program instructions. The persistent storage medium 303 may be a device that is configured to persistently store data, such as a flash memory or a disk. For example, the storage device 124 may be an SSD compliant with a non-volatile memory express (Non-Volatile Memory Express, NVMe). According to a definition of the NMMe protocol, the storage device 124 is an NVMe disk, the controller 301 is a controller, and the memory 302 is a controller memory buffer (controller memory buffer, CMB).

Figure 4A:
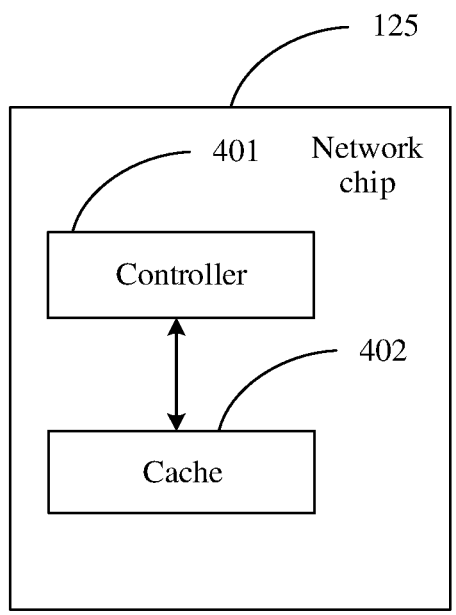
FIG. 4a is a block diagram of a structure of a network chip in the storage node in FIG. 2.

As shown in FIG. 4a, the network chip includes a controller 401 and a cache 402 that are connected to each other. The controller 401 is a control center of a network chip. The cache 402 is configured to store program instructions, and the controller 401 executes the program instructions in the cache 402, to implement functions corresponding to the program instructions.

Figure 4B:
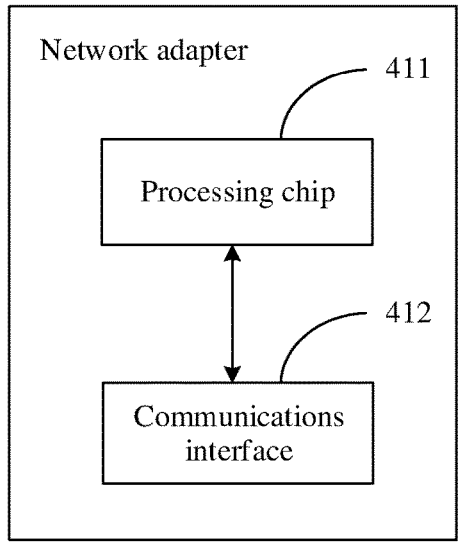
FIG. 4b is a block diagram of another structure of a network chip in the storage node in FIG. 2.

The network chip may also be a network adapter. A structure of the network adapter is shown in FIG. 4b. Specifically, the network adapter includes a processing chip 411 and a communications interface 412, where the processing chip 411 is configured to execute program instructions stored in the processing chip, to implement functions corresponding to the program instructions. The processing chip may be implemented by using a field programmable gate array (FPGA) or an application-specific integrated circuit (ASIC). The communications interface 412 is configured to receive/send data.

The storage node 120 may be an enterprise-class storage device or server, or any other device having a similar structure as shown in 120 in FIG. 2.

Embodiment 1

In this embodiment of the present invention, the network chip 125 needs to store information about a connection between the client and each storage device 124 in the memory 302 of each storage device 124. Therefore, a segment of memory space of each storage device needs to be provided for the network chip 125. The following describes, with reference to a flowchart of FIG. 5, a process of providing a segment of memory space of the storage device 124 for use by the network chip in this application.

Step S501: The controller 121 obtains a physical address that is in the storage device 124 and that is provided for the network chip 125 to use a first memory area.

Specifically, a user may set the physical address of the first memory area in the register of the storage device 124. When the storage node 120 is started, the controller 121 of the storage node reads the physical address of the first memory area that is set in the register. The physical address of the first memory area is a segment of address space of the memory 302. For example, a size of the memory 302 is 2G, and 1G space may be obtained as the first memory area through division. A size of the first memory area may be set according to an actual situation, which is not limited herein.

Step S502: The controller 121 allocates a system memory address to the first memory area.

Specifically, the controller 121 allocates the system memory address to the first memory area by using a memory management unit (Memory Management Unit, MMU), where the allocated system memory address is a virtual memory address that can be directly accessed by the controller 121.

Step S503: The controller 121 establishes a mapping between the system memory address and the physical address of the first memory area.

Specifically, the controller 121 may map, by using a controller memory buffer (Controller Memory Buffer, CMB) technology or a compute express link memory (Compute Express Link memory, CXL.MEM) protocol, the physical address of the first memory area to the virtual address space allocated by the controller.

Step S504: The controller 121 registers the first memory area with the network chip 125.

Specifically, the controller 121 sends, to the network chip 125 by using the bus 123, the system memory address allocated to the first memory area, and the network chip 125 may access the first memory area by using the system memory address.

Figure 6:
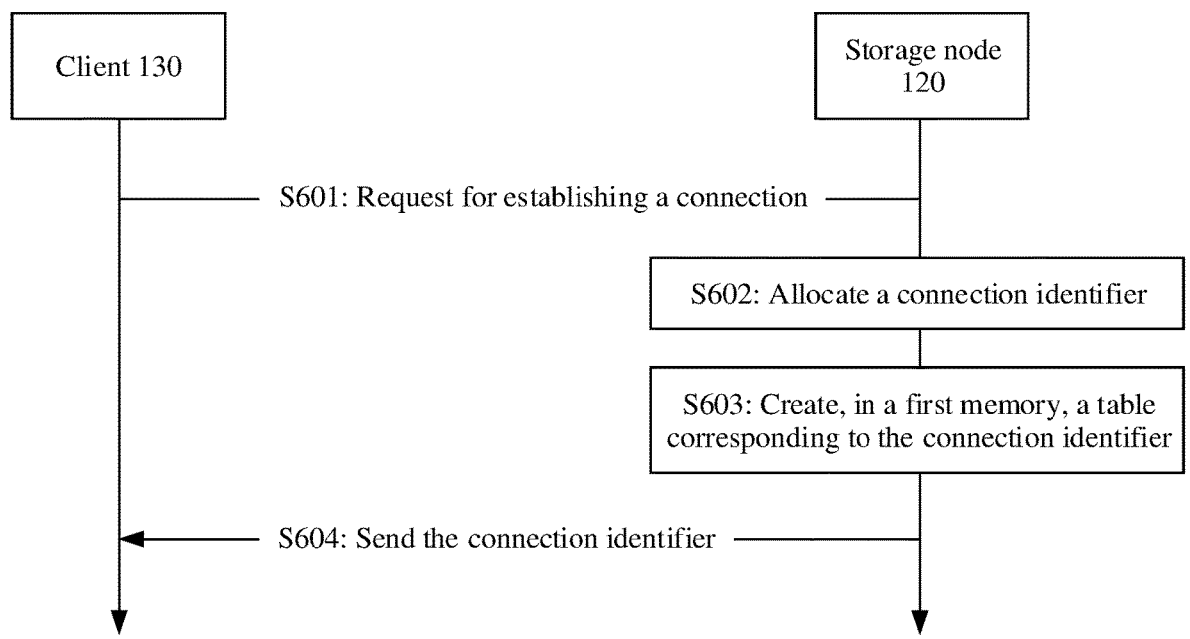
FIG. 6 is a flowchart of establishing a connection between a client and a storage device of a storage node.

After the storage device 124 provides the first memory area for the network chip 125 for use, and a connection is established between the storage device and the client, the network chip 125 may store information about the connection between the storage device 124 and the client 130 in the first memory area of the storage device 124. FIG. 6 shows a process of establishing a connection between a storage device and a client.

Step S601: The client 130 sends, to the storage node 120, a request for establishing a connection to the storage device 124.

Step S602: After receiving the connection request, the storage node 120 allocates a connection identifier to the connection between the client and the storage device 124.

Specifically, the controller 121 of the storage node executes a driver of the network chip, and configures the connection identifier for the client. In some embodiments, after the network chip 125 of the storage node 120 receives the connection request, this step is performed by the controller 401 of the network chip 125.

Step S603: The storage node 120 creates, in the first memory area of the storage device 124, a table corresponding to the connection identifier.

Specifically, the controller 121 of the storage node 120 establishes, in the first memory area of the storage device 124, the table corresponding to the connection identifier. The table is a data structure used to temporarily store a communication request between the storage device and the client. When the client communicates with the storage device by using RDMA, the table may be a send queue (SQ), a receive queue (RQ), and a complete queue.

After the table is created, a correspondence between the connection identifier and information about the table is recorded in the network chip 125. Specifically, the correspondence between the connection identifier and the information about the table is recorded in the cache 402 of the network chip 125. The information about the table includes a name of the table and an address of the table in the first memory area. For example, the correspondence may be recorded by using a hash table, to help quickly search for the connection identifier. For the RDMA, the RQ, the SQ, and the CQ may be taken as a whole, and a mapping relationship between the connection ID and addresses of the RQ, the SQ, and the CQ is recorded in the network chip, that is, only one correspondence is recorded. For example, only a correspondence between the connection ID and start addresses and lengths that are of the RQ, the SQ, and the CQ and that are stored in the first memory area is recorded. Alternatively, a correspondence between the connection ID and an address of each of the RQ, the SQ, and the CQ may be recorded separately for the addresses of the RQ, the SQ, and the CQ. For example, a correspondence between the connection ID and a start address and a length of each of the RQ, the SQ, and the CQ is recorded.

Step S604: The storage node 120 sends the connection identifier to the client.

After the client receives the connection identifier sent by the storage node 120, it may be determined that the connection is successfully established between the client and the storage device, and the client may send, based on the connection identifier, a request for accessing the storage device.

Figure 7:
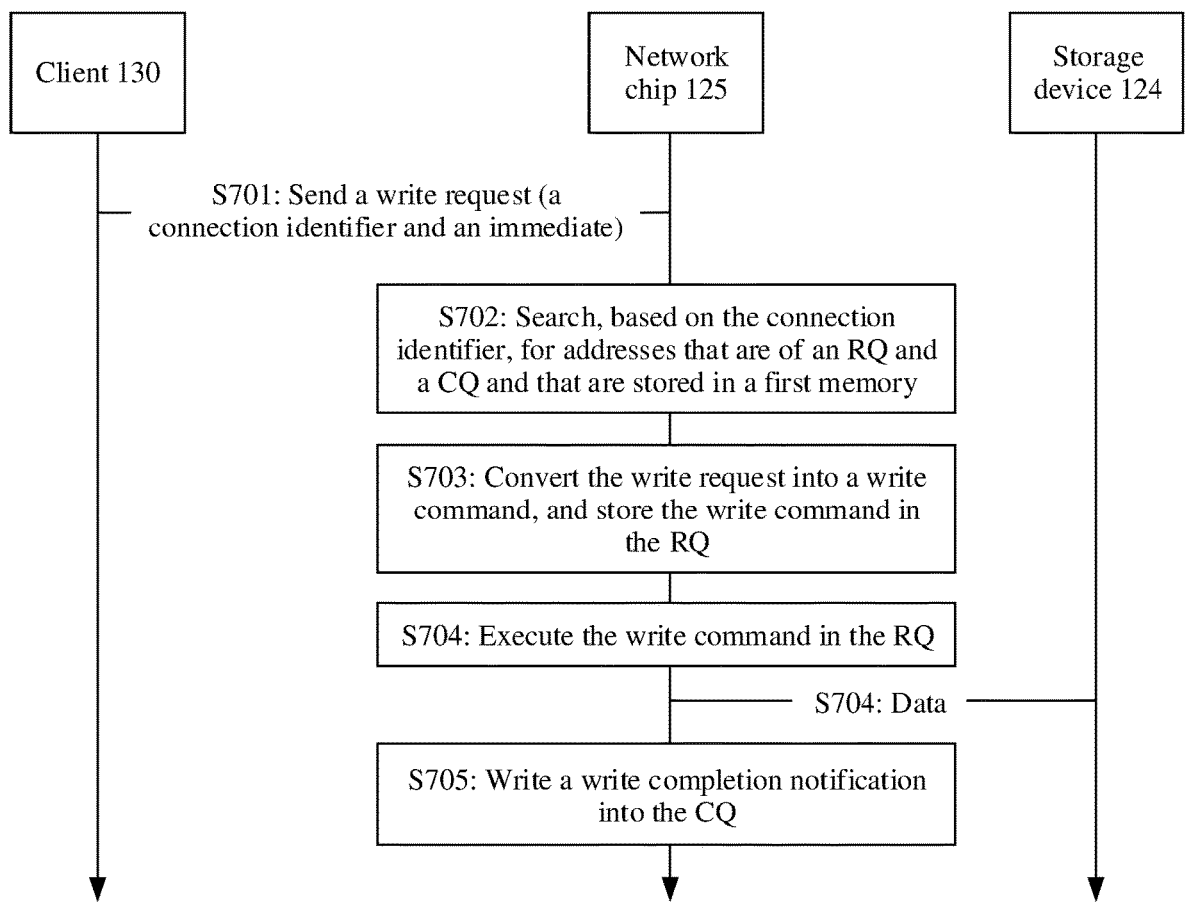
FIG. 7 is a flowchart of an immediate write request between a client and a storage node.
Figure 8:
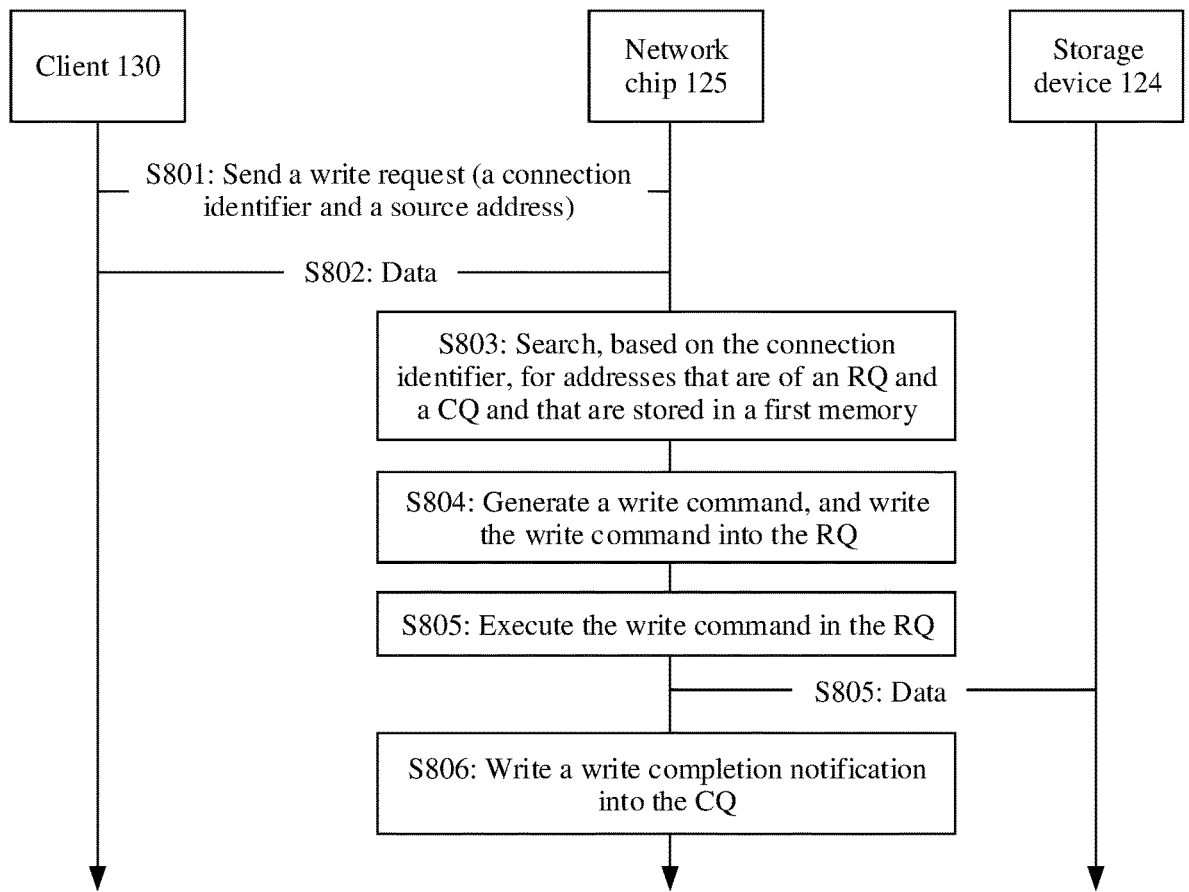
FIG. 8 is a flowchart of a non-immediate write request between a client and a storage node.
Figure 9:
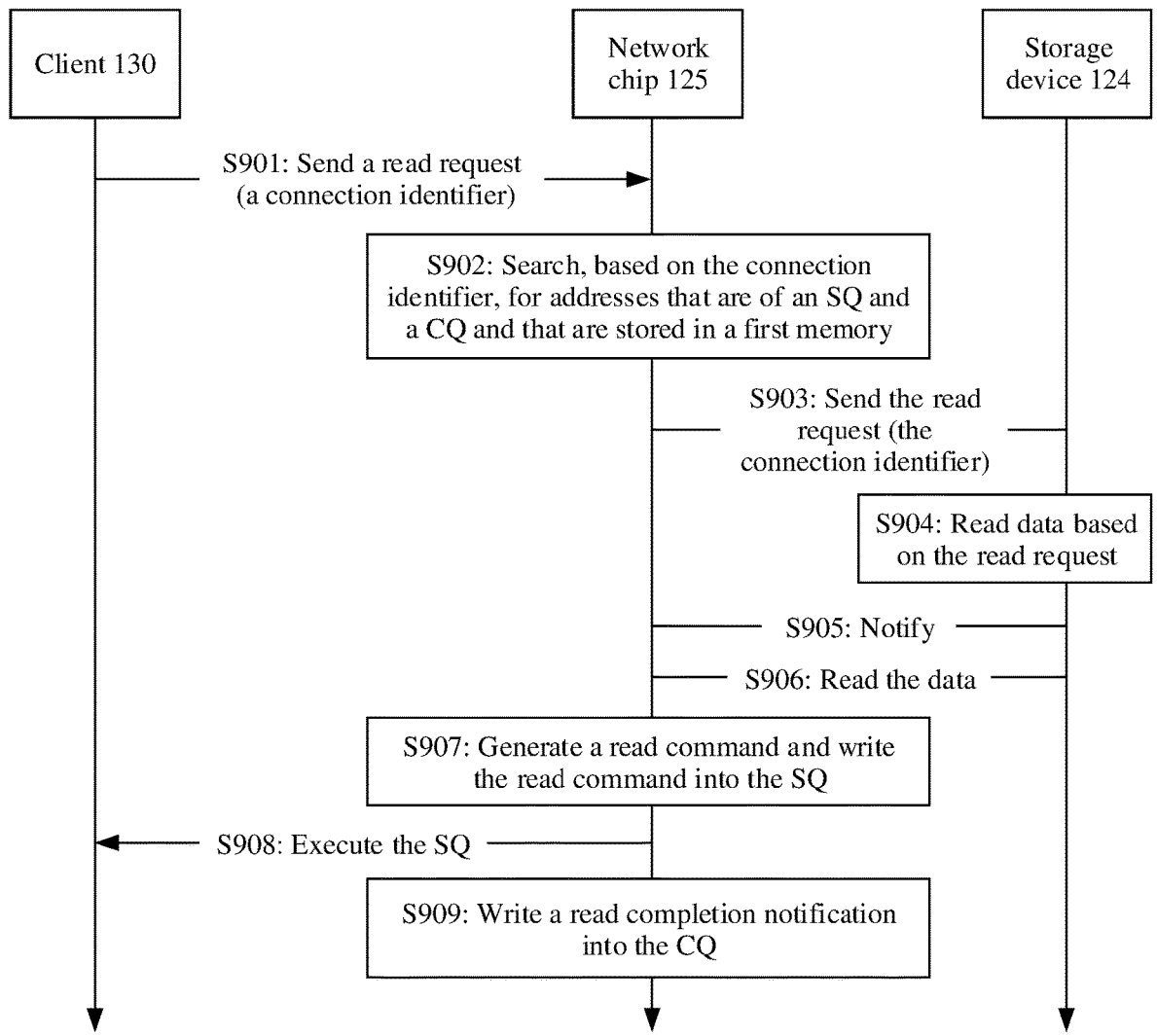
FIG. 9 is a flowchart of an immediate read request between a client and a storage node.
Figure 10:
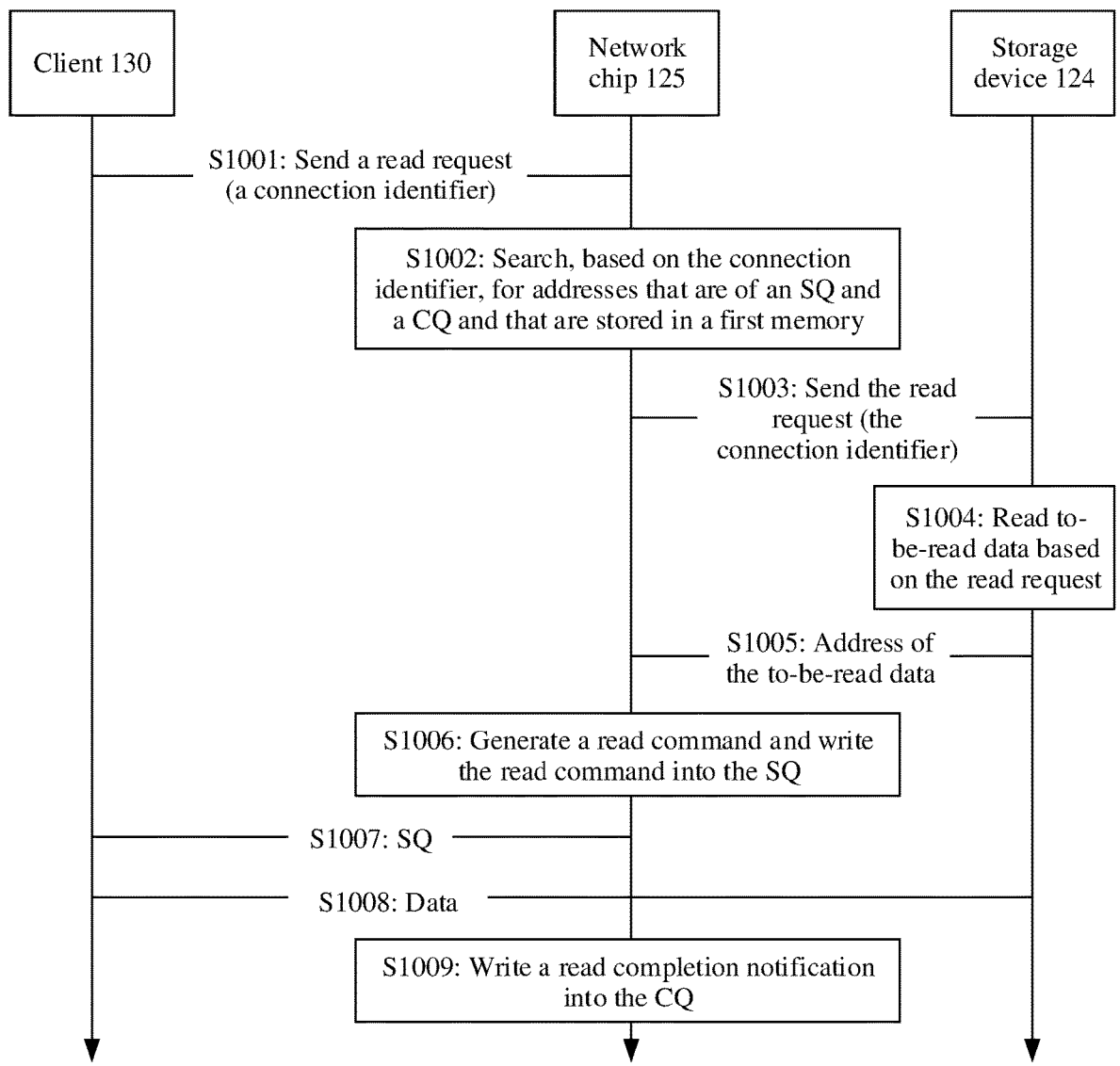
FIG. 10 is a flowchart of a non-immediate read request between a client and a storage node.

When the client sends the request to the storage device, the request may be classified into a general access request and an immediate access request based on a size of to-be-accessed data. An amount of data to be accessed by using the general access request is relatively large, and data transmitted between the client and the storage device cannot be carried in the access request. However, an amount of data carried in the immediate access request is relatively small, and the data transmitted between the client and the storage device can be directly carried in the access request. The following separately describes access processes of the two types of access requests. FIG. 7 is a flowchart of writing data into a storage device when an immediate access request is a write request. FIG. 8 is a flowchart of writing data into a storage device when a general access request is a write request. FIG. 9 is a flowchart of reading data from a storage device when an immediate access request is a read request. FIG. 10 is a flowchart of reading data from a storage device when a general access request is a read request.

Using the RDMA as an example, to ensure that a read/write request is smoothly performed, the storage device 124 needs to register second memory area space with the network chip 125. The second memory area space is used to store data of the read/write request, and the second memory area space and space of the first memory area are different memory space. A specific process in which the second memory area space is registered with the network chip 125 is the same as a process in which the first memory area is registered with the network chip. Refer to the procedure in FIG. 5, and details are not described herein again.

As shown in FIG. 7, first, in step S701, the client 130 sends a write request to the network chip 125.

The write request includes the connection identifier between the client and the storage device and to-be-written data. Because an amount of the to-be-written data is relatively small, the to-be-written data in an immediate manner is carried in the write request.

Step S702: The network chip 125 searches, based on the connection identifier, for addresses that are of an RQ and a CQ and that are stored in the first memory area in the storage device.

Specifically, the network chip 125 parses the write request, and searches, based on the connection identifier carried in the write request, a correspondence that is between the connection identifier and storage addresses of the RQ and the CQ and that is recorded in the cache 402 of the network chip for the storage addresses of the RQ and the CQ in the first memory area. Specifically, the network chip 125 searches for start addresses and lengths of the RQ and the CQ based on the connection identifier, to determine the storage addresses of the RQ and the CQ in the first memory area.

Step S703: The network chip 125 converts the write request into a write command, and stores the write command obtained through conversion in the RQ Specifically, the write request is data suitable for being sent in a network, and a structure of the data is different from a format of a command that can be executed in the network chip 125. In this case, after receiving the write request sent by the client 130, the network chip 125 converts the write request into the write command, and stores the write command in the RQ. The write command includes an immediate and a destination address.

Step S704: The network chip 125 executes the write command in the RQ, and writes data in the write command into a second memory area of the memory 302.

Specifically, the controller in the network chip 125 notifies a direct memory access (Direct Memory Access, DMA) engine in the network chip to write the immediate in the write command into the second memory area.

Step S705: The network chip 125 writes a write completion notification into the CQ.

After step S704, the network chip 125 writes the write completion notification into the CQ. After the client 130 detects that the write completion notification is written into the CQ, it indicates that execution of the write request is completed.

FIG. 8 is a flowchart in which the client 130 writes data into the storage node 120 in a general write request manner according to an embodiment of the present invention.

Step S801: The client 130 sends a write request to the network chip 125.

The write request includes the connection identifier between the client and the storage device and a source address. The storage device is a storage device into which to-be-written data corresponding to the write request is written, and the source address is an address at which the to-be-written data is stored in the client.

Step S802: The network chip 125 writes the to-be-written data of the write request into cache space corresponding to the network chip 125.

The cache space corresponding to the network chip 125 is the cache 402 of the network chip or the first memory area that is in the storage device and that is provided for the network chip 125.

Specifically, the network chip 125 obtains a size of the to-be-written data based on a length of the source address in the write request, creates, in the cache 402 of the network chip or the first memory area of the storage device, storage space used to temporarily store the to-be-written data, and writes the to-be-written data into the created storage space.

Step S803: The network chip 125 searches, based on the connection identifier, for addresses that are of an RQ and a CQ and that are stored in the first memory area.

A specific execution process is the same as that in step S702, and details are not described herein again.

Step S804: The network chip 125 generates a write command, and writes the write command into the RQ.

Specifically, the write command is an executable command in the RQ, a source address of the write command is an address of the to-be-written data stored in the cache 402 of the network chip or the first memory area of the storage device 124, and a target address is an address of the to-be-written data written into a second memory area of the storage device.

Step S805: The network chip 125 executes the write command in the RQ, and writes the to-be-written data into the second memory area of the storage device.

Specifically, the network chip moves, via a DMA chip, the to-be-written data from the cache 402 of the network chip indicated by the source address of the write command to the second memory area indicated by the target address of the write command.

Step S806: The network chip 125 writes a write completion notification into the CQ.

After step S805, the network chip 125 writes the write completion notification into the CQ. After the client 130 detects that the write completion notification is written into the CQ, it indicates that execution of the write request is completed.

FIG. 9 is a flowchart in which a client reads data from a storage node in an immediate manner.

Step S901: The client 130 sends a read request to the network chip 125.

The read request includes the connection identifier between the client and the storage device, and the storage device is a storage device that stores to-be-read data corresponding to the read request.

Step S902: The network chip 125 searches, based on the connection identifier, for addresses that are of an SQ and a CQ and that are stored in the first memory area.

Specifically, the network chip 125 parses the read request, obtains the connection identifier, and finds the corresponding addresses of the SQ and the CQ in a record of the network chip 125 based on the connection identifier.

Step S903: The network chip 125 sends the read request to the storage device 124.

Step S904: The storage device 124 reads the to-be-read data based on the read request.

Specifically, after receiving the read request, the storage device 124 reads data in the persistent storage medium 303 into a second memory area of the storage device.

Step S905: The storage device 124 notifies the network chip 125 to read the to-be-read data.

Notification information includes an address of data stored in the second memory area.

Step S906: The network chip 125 reads, from the memory of the storage device 124, the to-be-read data into cache space corresponding to the network chip 125.

The cache space corresponding to the network chip 125 is the cache of the network chip or the first memory area provided by the storage device for the network chip for use. The network chip creates the cache space in the cache 402 of the network chip or the first memory area of the storage device based on a size of the address of the data stored in the second memory area, and then stores the data in the second memory area of the storage device into the cache space.

Step S907: The network chip generates a read command and writes the read command into the SQ.

Because data is sent and received in an immediate manner, the network chip 125 generates the read command based on the data in the cache space of the network chip in step S906, and writes the read command into the SQ.

Step S908: The network chip 125 executes the read command in the SQ.

Specifically, the network chip 125 executes the SQ, and sends the read command in the SQ to the network chip 135 of the client. After receiving and parsing the read command, the client writes data in the read command into the client.

After receiving the SQ, the client parses and obtains data in the SQ.

Step S909: The network chip 125 writes a read completion notification into the CQ.

When the client 130 detects that the read completion notification is written into the CQ, it indicates that execution of the read request is completed.

FIG. 10 is a flowchart in which a client reads data from a storage node in a general read request manner.

Step S1001: The client 130 sends a read request to the network chip 125.

The read request includes a connection identifier.

Step S1002: The network chip 125 searches, based on the connection identifier, for addresses that are of an SQ and a CQ and that are stored in the first memory area.

Specifically, the network chip 125 parses the read request, obtains the connection identifier, and finds the corresponding addresses of the SQ and the CQ in a record of the network chip 125 based on the connection identifier.

Step S1003: The network chip 125 sends the read request to the storage device 124.

Step S1004: The storage device 124 reads to-be-read data based on the read request.

Specifically, after receiving the read request, the storage device 124 reads data in the persistent storage medium 303 into a second memory area of the storage device.

Step S1005: The storage device 124 sends an address of the to-be-read data to the network chip 125.

Specifically, the storage device stores, in the second memory area, an address of the data read in step S1004.

Step S1006: The network chip 125 generates a read command and writes the read command into the SQ.

Specifically, the network chip writes a storage address of the to-be-read data in the second memory area as a source address of the read command into the SQ.

Step S1007: The network chip 125 executes the read command in the SQ.

Specifically, the network chip 125 sends the read command in the SQ to the client.

Step S1008: The client 130 reads data according to the read command in the SQ.

Specifically, the client parses the read command in the SQ, and reads the data in the second memory area into a cache of the network chip of the client according to the storage address of the data in the second memory area.

Step S1009: The network chip 125 writes a read completion notification into the CQ.

After the client 130 detects that the read completion notification is written into the CQ, it indicates that fetching the data from the storage device is completed. The network chip 135 of the client 130 writes the to-be-read data in the cache of the network chip into a memory of the client, and therefore, data reading can be completed.

Because maintaining a connection needs to occupy memory space of the storage device, after communication between the client and the storage device ends, the network chip deletes the correspondence between the table and the connection identifier from the record, and releases the table resource in the first memory space of the storage device.

In Embodiment 1, a part of memory space of the storage device 124 is opened to the network chip, and a table for communication between the client and the storage device is stored in the memory space opened by the storage device 124 to the network chip, where the network chip stores only a correspondence between a connection identifier and an address of the table. Compared with that in the related technology in which information about connections between all storage devices and clients is stored in a network chip, storage space of the network chip is saved, and the network chip can simultaneously support more connections between the storage devices and the clients.

Embodiment 2

Embodiment 1 discloses a process of opening the memory space of one storage device 124 in the storage node to the network chip. Based on this, memory space of each storage device 124 in the storage node may be opened to the network chip, and each storage device 124 stores information of a table in the memory space of each storage device.

Figure 11:
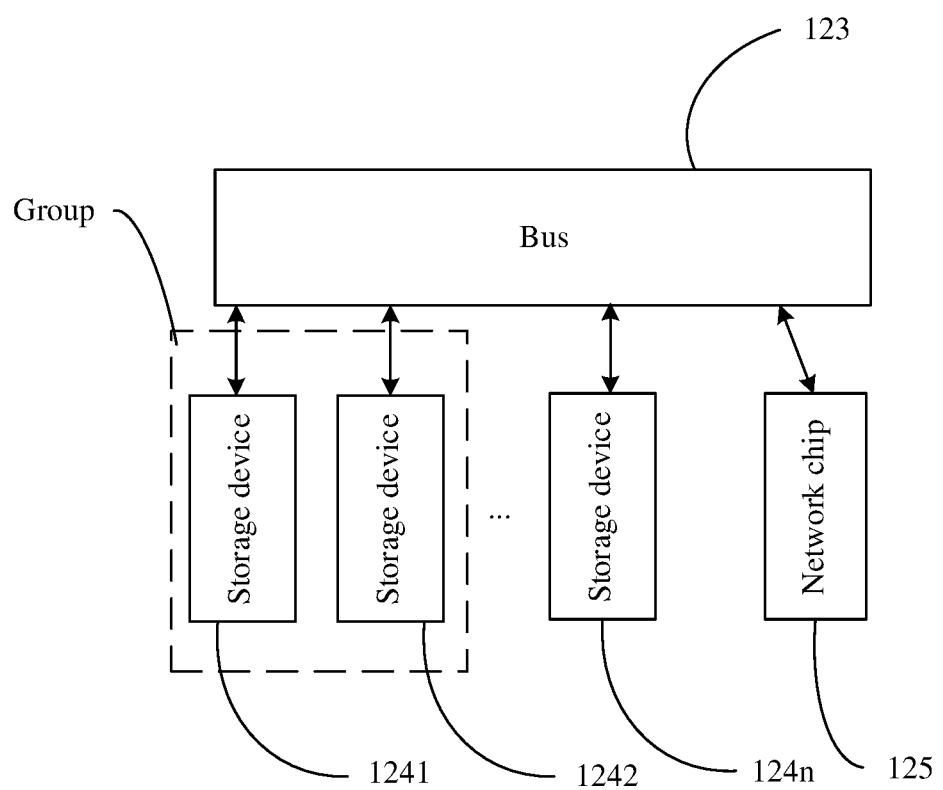
FIG. 11 is a block diagram of a structure of establishing a group between storage devices according to Embodiment 2.

Embodiment 2 provides a technical solution in which a plurality of storage devices 124 are used as one group, and the solution has higher reliability. For example, as shown in FIG. 11, two of n storage devices 1241 to 124n are selected as a storage group in FIG. 11, for instance, the storage device 1241 and the storage device 1242 are used as a group. The storage device 1241 and the storage device 1242 open their respective first memory areas to the network chip 125 according to the procedure in FIG. 5, and establish a connection to the client according to the procedure in FIG. 6. A difference from that in FIG. 6 is: After step S602 is performed, information about the group is recorded in the network chip 125 of the storage node. Specifically, the network chip allocates a group identifier to the established group, and records a correspondence between a group name and a connection identifier in the cache 402 of the network chip. For example, a connection between the storage device 1241 and the client 130 and a connection between the storage device 1242 and the client 130 are used as a group, and a group identifier is allocated. A correspondence between the group identifier and a connection identifier between each of the storage device 1241 and the storage device 1242 and the client 130 is recorded in the cache 402 of the network chip 125.

Subsequently, when step S603 is performed, the storage node 120 creates, based on a connection identifier of each the storage device, a table of the storage device in the group in first memory areas of all the storage devices in the group. Specifically, for FIG. 11, the storage node 120 may create a first table in respective first memory areas of the storage device 1241 and the storage device 1242 based on a connection identifier between the client and the storage device 1241, where the first table is used for data sending and receiving between the client 130 and the storage device 1241. In addition, the storage node 120 creates a second table in the respective first memory areas of the storage device 1241 and the storage device 1242 based on a connection identifier between the client and the storage device 1242, where the second table is used for data sending and receiving between the client 130 and the storage device 1241. Finally, a correspondence between the connection identifier and the first table and a correspondence between the connection identifier and the second table are recorded in the network chip 125. Specifically, for the case in FIG. 11, each connection identifier corresponds to two tables.

When each storage device works normally, if the client sends a write/read request to the storage device 1241, after the read/write request reaches the network chip 125, the network chip 125 finds, based on a connection identifier in the read/write request, information stored in two tables of the storage device 1241 and the storage device 1242. The network chip selects one of two tables for use. Optionally, the network chip may select the table located in the target storage device 1241. This can reduce link consumption for data forwarding between storage devices.

When the network chip 125 detects that the storage device 1241 is faulty, the network chip 125 may locate the connection identifier in the read/write request to the spare table in the storage device 1242 in the group, and send and receive data by using the spare table. After the storage device 1241 recovers from a fault, the storage device 1242 sends the data to the storage device 1241 through the bus 123, thereby improving reliability in the group.

Optionally, the data in the write/read request may be read/written simultaneously by the storage device 1241 and the storage device 1242. In this way, two copies of data are stored in the storage device 1241 and the storage device 1242, to improve data reliability.

The plurality of storage devices 124 are classified into a group, so that in first memory area space opened by each storage device in the group to the network chip, tables of other storage devices 124 in the group and the client may be created. However, when any storage device in the group is faulty, data receiving and sending may continue to be performed by using a table in a memory of another storage device, to improve reliability of data sending and receiving; or the storage devices in the group back up each other, to improve data reliability.

Embodiment 3

Figure 12:
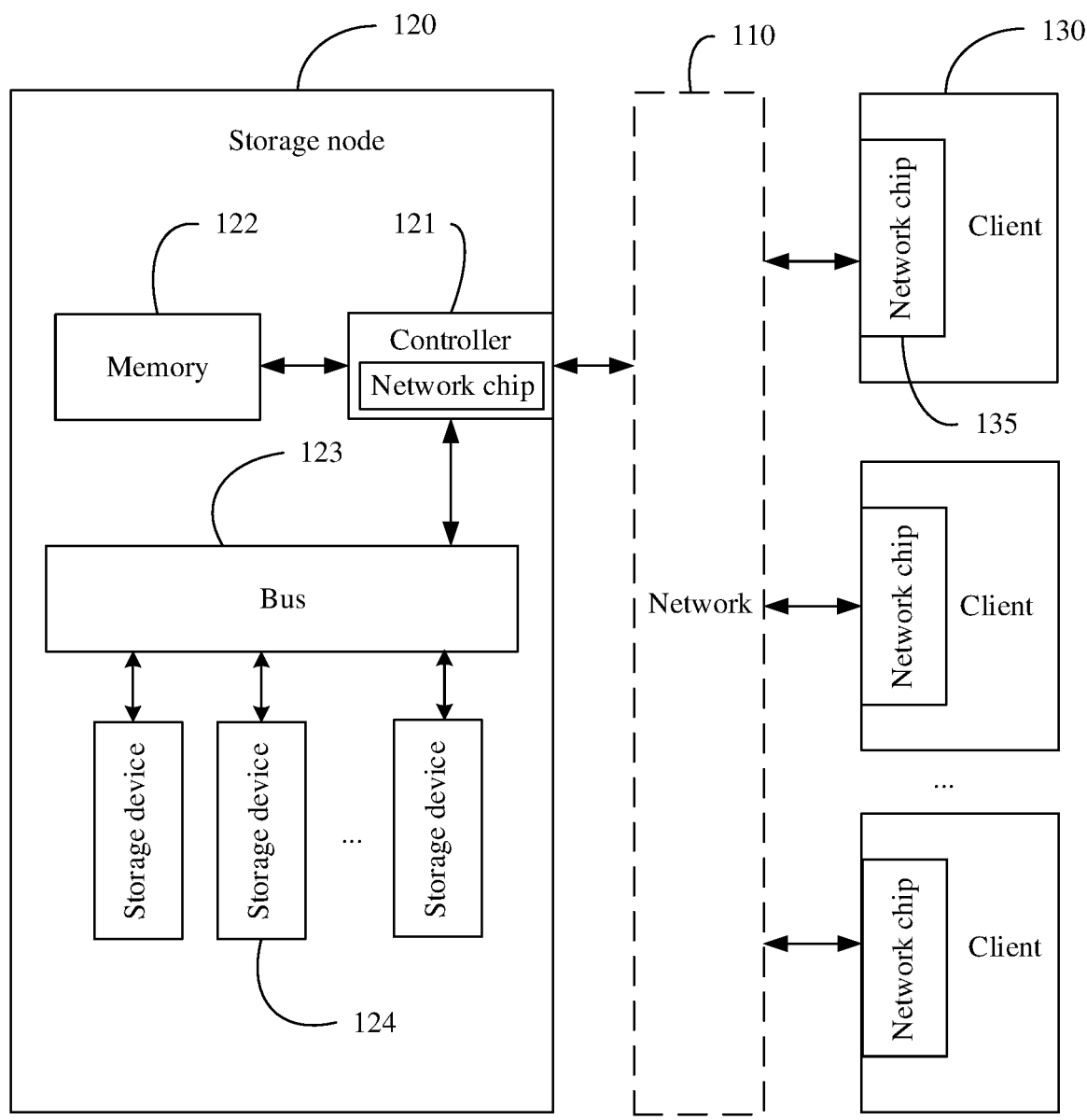
FIG. 12 is a block diagram of a structure of a system according to Embodiment 3.

In Embodiment 1 and Embodiment 2, the network chip is an independent component in the storage node. Embodiment 3 provides a technical solution in which the network chip is disposed in the controller 121 of the storage node. A specific system structure is shown in FIG. 12. A difference from Embodiment 1 and Embodiment 2 lies in that the network chip in FIG. 2 in Embodiment 1 is integrated into the controller 121 of the storage node, and the network chip in the controller 121 is connected to the network.

Figure 5:
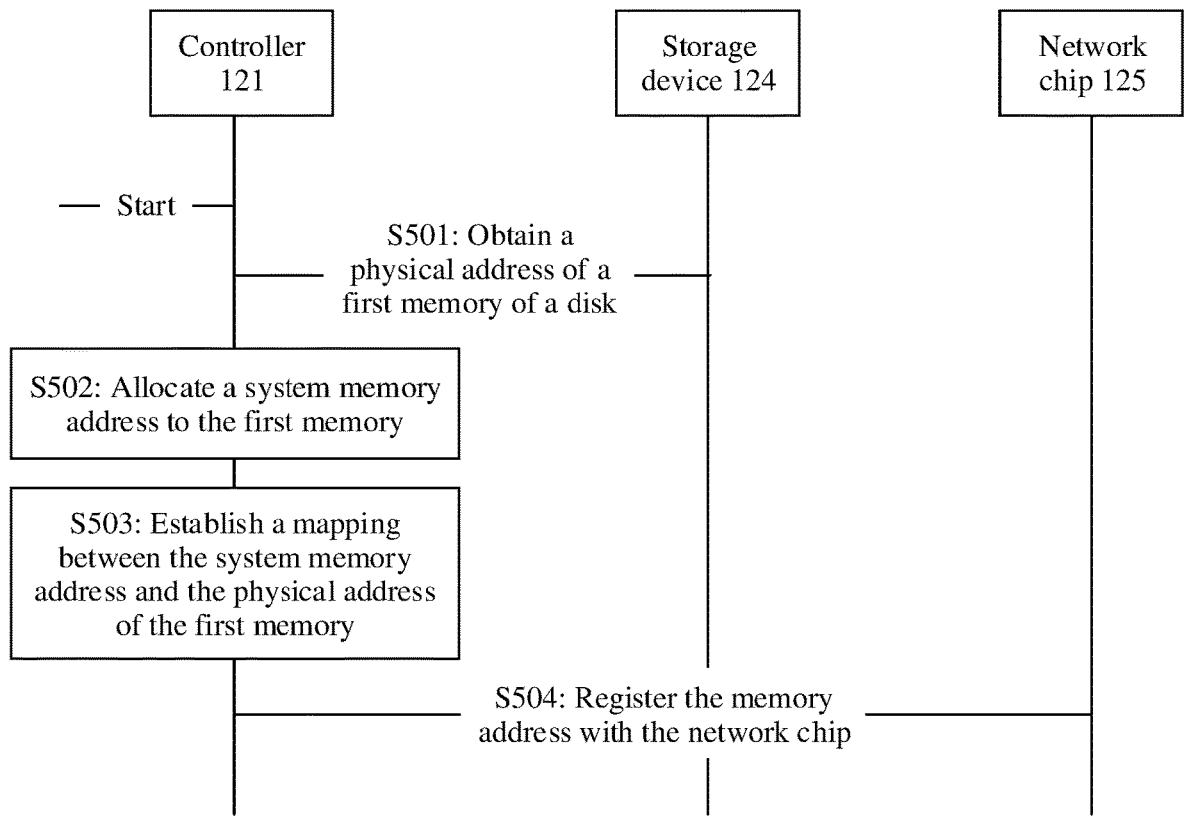
FIG. 5 is a flowchart of opening a first memory area of memory space of a storage device to a network chip.

In a system model of Embodiment 3, because the network chip is disposed in the controller, a difference between the process in which the storage device 124 opens the first memory area to the network chip and that in FIG. 5 lies in that step S504 does not need to be performed. A reason is that the network chip is disposed in the controller 121, and therefore, memory address information in the controller 121 in step S503 may be directly obtained.

A difference between the process of establishing the connection between the client and the storage device of the storage node and that in FIG. 6 lies in that the storage node in FIG. 6 is replaced with the controller 121.

A difference between the read/write operation between the client and the storage device of the storage node and that in FIG. 7 to FIG. 10 lies in that operations performed by the network chip in FIG. 7 to FIG. 10 are performed by the network chip located in the controller.

Embodiment 4

Figure 13:
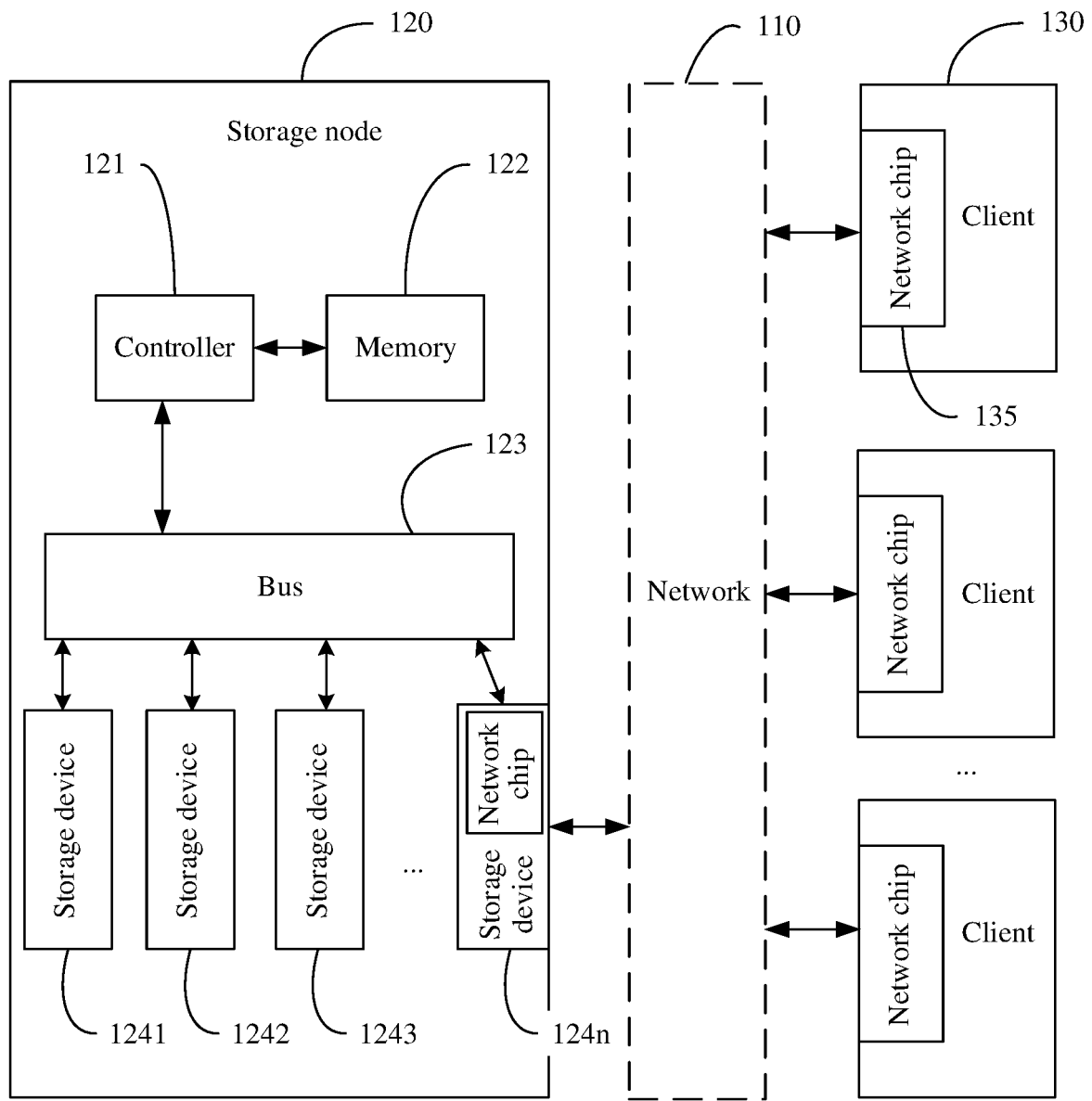
FIG. 13 is a block diagram of a structure of a system according to Embodiment 4.

Embodiment 4 provides a technical solution in which the network chip 125 is disposed in the storage device. A specific system structure is shown in FIG. 13. A difference from that in FIG. 2 lies in that in FIG. 13, a storage device 124n is in network connection to the client via a network chip inside the storage device 124n, and is configured to transmit data with the client. FIG. 13 shows only a case in which one storage device 124n is connected to the network. Optionally, during actual processing, all storage devices 1241 to 124n of the storage node may be connected to the network via network chips inside the storage devices, and then are connected to a plurality of clients.

Further, a network chip may be disposed in only one storage device (for example, the storage device 124n) in the storage node, a first memory area of another storage device is opened to the storage device 124n by using the bus 123, and the client 130 establishes a connection to the another storage device by using the storage device 124n and performs data transmission.

In a system model of Embodiment 4, because the network chip is disposed in the storage device 124n, a process in which the storage device 124n opens the first memory area to the network chip may be directly performed in the storage device 124n. A reason is that the network chip is disposed in the storage device 124n, and therefore, memory address information in the storage device 124n may be directly obtained. If a memory address of another storage device other than the storage device 124n is opened to a total network chip of the storage device 124n, a difference between this procedure and that in FIG. 5 lies in that the storage device 124 in FIG. 5 is replaced with any one of the storage device 1241 to the storage device 124(n−1), and the network chip 125 is replaced with the network chip in the storage device 124n.

A difference between the process of establishing a connection between the client and the storage device of the storage node and that in FIG. 6 lies in that the storage node 120 in FIG. 6 is replaced with the storage device 124n. Specifically, step S602 and step S603 are executed by a controller in the storage device 124n.

A difference between the read/write operation between the client and the storage device of the storage node and that in FIG. 7 to FIG. 10 lies in that operations performed by the network chip in FIG. 7 to FIG. 10 are performed by the network chip located in the storage device 124n.

Figure 14:
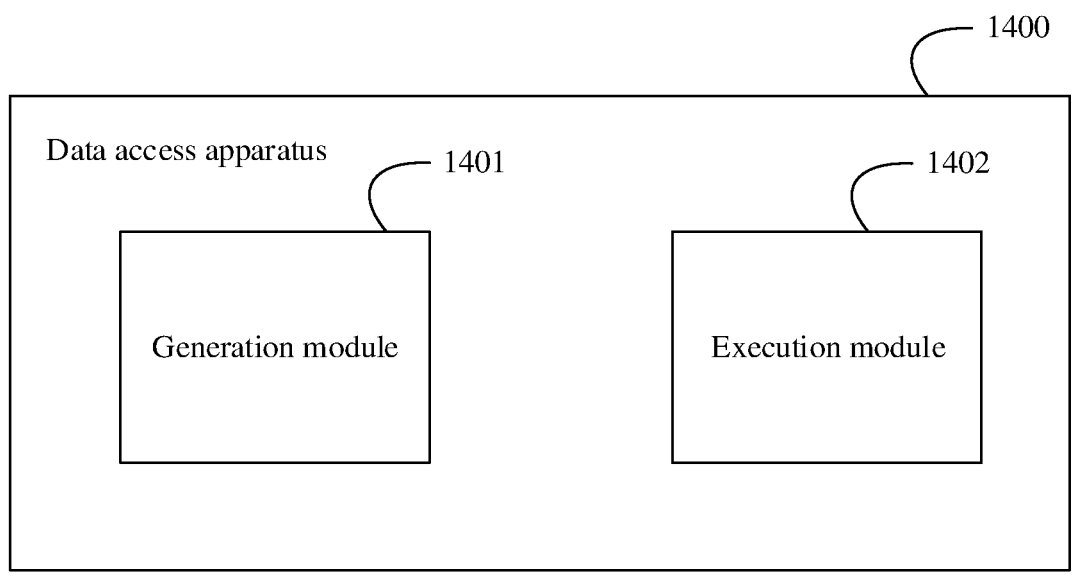
FIG. 14 is a block diagram of a system of a data access apparatus according to the present invention.

The present invention further provides a data access apparatus 1400. As shown in FIG. 14, the data access apparatus 1400 is applied to the network chip 125 in Embodiment 1, the network chip is connected to a storage device, and the data access apparatus 1400 includes a generation module 1401 and an execution module 1402.

The generation module 1401 is configured to generate a command based on an access request of a client. The generation module 1401 is further configured to perform step S703 in FIG. 7, step S804 in FIG. 8, step S907 in FIG. 9, and step S1006 in FIG. 10. Details are not described herein again.

The execution module 1402 is configured to: store the command in a first table in a memory of the storage device, and execute the command in the first table to access the storage device. The execution module 1402 is further configured to perform steps S702, S704, and S705 in FIG. 7, steps S802, S803, S805, and S806 in FIG. 8, steps S902, S906, and S907 to S909 in FIG. 9, and steps S1002, S1006, S1007, and S1009 in FIG. 10, and details are not described herein again.

In addition, the data access apparatus may further include a communications module 1403, configured to receive a connection request of the client. The communications module 1403 is further configured to perform step S604 in FIG. 6, steps S701 and S704 in FIG. 7, steps S801, S802, and S805 in FIG. 8, steps S901, S903, S905, and S908 in FIG. 9, and steps S1001, S1003, S1005, S1007, and S1008 in FIG. 10, and details are not described herein again.

An embodiment of this application further provides a computer-readable storage medium, including instructions. When the instructions are run on a computer, the computer is enabled to perform the method in Embodiment 1 to Embodiment 4.

An embodiment of this application further provides a computer program product, including instructions. When the computer program product is run on a computer, the computer is enabled to perform the method in Embodiment 1 to Embodiment 4.

It should be understood that descriptions such as "first" and "second" in this specification distinguish similar concepts for simplicity of description, and do not have other limiting functions.

A person skilled in the art may be further aware that, in combination with the examples described in the embodiments disclosed in this specification, units and algorithm steps may be implemented by electronic hardware, computer software, or a combination thereof. To clearly describe interchangeability between the hardware and the software, compositions and steps of each example have generally been described in the foregoing specification based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A storage drive, comprising a memory and a network chip, wherein the memory is configured to store data; and
the network chip is configured to:
store a correspondence between an identifier of a connection between a client and the storage drive and an address of a first table;
generate a command based on an access request from a client;
obtain the identifier of the connection between the client and the storage drive from the access request;
determine the address of the first table based on the identifier of the connection;
store the command in a first table, wherein the first table is stored in the memory; and
execute the command in the first table to access data stored in the memory.

2. The storage drive according to claim 1, wherein the network chip is further configured to:
receive a connection request from the client;
generate the identifier of the connection based on the connection request;
generate the first table in the memory; and
record the correspondence between the identifier of the connection and the address of the first table.

3. The storage drive according to claim 1, wherein the storage drive further comprises a controller, and the controller is configured to:
obtain an address of a first memory area in the memory; and
register the address of the first memory area with the network chip; and wherein
the network chip is configured to:
generate the first table in the first memory area in the memory.

4. The storage drive according to claim 3, wherein the network chip is further configured to:
after receiving a connection request of the client, generate a second table in the memory; and
after executing the command in the first table, store a notification message indicating that execution of the command is completed in the second table.

5. A storage node, comprising:
one or more processors;
a plurality of storage drives including a first storage drive, wherein each storage drive in the plurality of storage drives comprises a memory and a persistent storage medium configured to persistently store data, and each storage drive in the plurality of storage drives is communicatively connected to a client; and
a network chip configured to:
store connection information between each storage drive in the plurality of storage drives and the client in a memory of the corresponding storage drive; and
in response to a first access request from the client to the first storage drive, access the first storage drive based on the connection information between the first storage drive and the client stored in a memory of the first storage drive.

6. The storage node according to claim 5, wherein when the network chip is configured to in response to a first access request from the client to the first storage drive, access the first storage drive based on the connection information between the first storage drive and the client stored in the memory of the first storage drive, the network chip is specifically configured to:
generate a command based on the first access request;
store the command in a first table, wherein the connection information between the first storage drive and the client comprises the first table; and
execute the command in the first table to access data stored in the first storage drive.

7. The storage node according to claim 6, wherein the network chip stores a correspondence between an identifier of a connection between the client and the first storage drive and an address of the first table, and wherein the network chip is further configured to:
obtain the identifier of the connection between the client and the first storage drive from the first access request;
determine the address of the first table based on the identifier of the connection; and
store the command in the first table.

8. The storage node according to claim 7, wherein the network chip is further configured to:
receive a connection request from the client, wherein the connection request is used to establish a connection between the client and the first storage drive;
generate the identifier of the connection based on the connection request;
generate the first table in the memory of the first storage drive; and
record the correspondence between the identifier of the connection and the address of the first table.

9. The storage node according to claim 8, wherein the one or more processors are configured to:
obtain an address of a first memory area in the memory of the first storage drive; and
register the address of the first memory area with the network chip; and wherein
the network chip is configured to:
generate the first table in the first memory area in the memory of the first storage drive.

10. The storage node according to claim 6, wherein the connection between the client and the first storage drive is a remote direct memory access (RDMA) connection, and the first table is a receive queue (RQ) or a send queue (SQ).

11. The storage node according to claim 8, wherein the network chip is further configured to:
after receiving the connection request, generate a second table in the memory of the first storage drive and record a correspondence between the identifier of the connection and an address of the second table; wherein the connection information between the first storage drive and the client comprises the second table;

after obtaining the identifier of the connection from the first access request, obtain the address of the second table; and after executing the command in the first table, store a notification message indicating that execution of the command is completed in the second table.

12. The storage node according to claim 11, wherein the second table is a complete queue (CQ).

13. The storage node according to claim 9, wherein the first access request is a write request, the first table is a receive queue (RQ), the command is a write command, and the network chip is further configured to:

after receiving the write request, write to-be-written data into the first memory area or into a cache of the network chip, wherein the to-be-written data are data to be written by the write request; and write the to-be-written data into a second memory area in the memory of the first storage drive from the first memory area or the cache of the network chip.

14. The storage node according to claim 9, wherein the first access request is a write request, the first table is a receive queue (RQ), the command is a write command, and the write request carries to-be-written data; and wherein the network chip is configured to:

write the to-be-written data into a second memory area in the memory of the first storage drive from the first table, wherein the command comprises the to-be-written data.

15. The storage node according to claim 9, wherein the first access request is a read request, the first table is a send queue (SQ), the command is a read command; and wherein the network chip is further configured to:

forward the read request to the first storage drive, so that the first storage drive reads to-be-read data corresponding to the read request into a second memory area in the memory of the first storage drive, wherein the read command is used for reading the to-be-read data from the second memory area.

16. The storage node according to claim 9, wherein the first access request is a read request, the first table is a send queue (SQ), the command is a read command; and wherein the network chip is further configured to:

forward the read request to the first storage drive, so that the first storage drive reads to-be-read data corresponding to the read request into a second memory area in the memory of the first storage drive, wherein the read command carries the to-be-read data.

17. The storage node according to claim 6, when the network chip is configured to execute the command in the first table, the network chip is specifically configured to execute the command in the first table by accessing a first memory area of the first storage drive.

18. A data access method comprising:

storing, by a network chip, connection information between each storage drive in a plurality of storage drives and a client in a memory of the corresponding storage drive, wherein the network chip and the plurality of storage drives are components of a storage node and the plurality of storage drives comprises a first storage drive; and in response to a first access request from the client to the first storage drive, accessing, by the network chip, the first storage drive based on the connection information between the first storage drive and the client stored in a memory of the first storage drive.

19. A method according to claim 18, wherein the accessing, by the network chip, the first storage drive based on the connection information between the first storage drive and the client stored in a memory of the first storage drive comprising:

generating, by the network chip, a command based on the first access request;

storing, by the network chip, the command in a first table, wherein connection information between the first storage drive and the client comprises the first table; and executing, by the network chip, the command in the first table to access data stored in the first storage drive.

20. The method according to claim 19, wherein the network chip stores a correspondence between an identifier of a connection between the client and the first storage drive and an address of the first table, and the storing the command in a first table comprises:

obtaining, by the network chip, the identifier of the connection between the client and the first storage drive from the first access request;

determining, by the network chip, the address of the first table based on the identifier of the connection; and storing, by the network chip, the command in the first table.

21. The method according to claim 19, wherein the executing the command in the first table to access the first storage drive comprising:

executing the command in the first table by accessing a first memory area of the first storage drive.

* * * * *